United States Patent [19]
Honda et al.

[11] Patent Number: 5,635,432
[45] Date of Patent: Jun. 3, 1997

[54] HIGH-STRENGTH SILICON NITRIDE SINTERED BODY

[75] Inventors: Toshihiko Honda; Hisayoshi Nonaka, both of Nagoya, Japan

[73] Assignee: NGK Insulators, Ltd., Nagoya, Japan

[21] Appl. No.: 678,081

[22] Filed: Jul. 10, 1996

[30] Foreign Application Priority Data

Jul. 11, 1995 [JP] Japan ................................. 7-174607

[51] Int. Cl.$^6$ ................................. C04B 35/587
[52] U.S. Cl. ................................. 501/97.1
[58] Field of Search ................................. 501/97, 98

[56] References Cited

U.S. PATENT DOCUMENTS 5,006,491  4/1991  Ueda et al. ................. 501/97

FOREIGN PATENT DOCUMENTS 57-123868  8/1982  Japan .
7-223863   8/1995  Japan .

OTHER PUBLICATIONS

M. Asayama et al., The proceedings of the 1993 *Annual Meeting of the Japan Ceramic Society*, "The Effect of Halogen Impurities in Raw Powder on Mechanical Properties of $Si_3N_4$ Sintered Bodies"—p. 611.

I. Tanaka et al., "High–Temperature Strength of Fluorine–Doped Silicon Nitride", *Journal of the American Ceramic Society*, vol. 77, No. 1 (1994), pp. 275–277.

*Primary Examiner*—Karl Group
*Attorney, Agent, or Firm*—Ronald J. Kubovcik

[57] ABSTRACT

A high-strength silicon nitride sintered body wherein the halogen element content in the silicon nitride sintered body is 200 ppm or higher. The silicon nitride sintered bodies have high strength at near room temperature. Therefore, such sintered bodies may be used favorably as a structural material for mechanical parts and the like, such as sliding members, whose strength at near room temperature is important.

4 Claims, No Drawings

1
HIGH-STRENGTH SILICON NITRIDE SINTERED BODY

BACKGROUND OF THE INVENTION

1. Field of the Invention

The present invention relates to a silicon nitride sintered body with an improved strength near room temperature.

2. Description of the Related Art

Silicon nitride sintered bodies have recently attracted attention for their high strength and chemical stability, and their use in mechanical parts and the like has been expanded. With such increase in use, the effects of impurities contained in silicon nitride sintered bodies on their properties have frequently studied.

As one of results of curent studies, the proceeding of 1993 Annual Meeting of JAPAN Ceramic Society "The Effect of Halogen Impurities in Raw Powder on Mechanical Properties of $Si_3N_4$ Sintered Bodies" (M. Asayama, A. Tsuge, S. Kanzaki, K. Watari, K. Isozaki, H. Hiroturu) describes that halogen elements (fluorine, chlorine) contained in silicon nitride sintered bodies showed lower high-temperature strength (flexural strength at 1250° C.).

The article "High-Temperature Strength of Fluorine-Doped Silicon Nitride" in Journal of the American Ceramic Society, Vol. 77, No. 1 (1994), pp. 275–277 describes that fluorine contained in silicon nitride sintered bodies causes the degradation of creep resistance at high temperature (1400° C.).

Both of these studies suggest that the reduction of contents of halogen elements (fluorine, chlorine), especially of fluorine is desirable when a silicon nitride sintered body is used for mechanical parts at high temperatures.

However, it was found that although the reduction of content of halogen elements, especially fluorine, in silicon nitride sintered bodies is effective for improving high-temperature strength, the reduction of content of halogen elements, especially fluorine, tends to degrade room-temperature strength. Therefore, silicon nitride sintered bodies with a reduced halogen element, especially fluorine, content is not always preferable for applications in which room-temperature strength is more important, such as materials for sliding members and the like.

The present invention was devised considering such situations, and it is the object of the present invention to provide a silicon nitride sintered body which can preferably be used as a material composing mechanical parts and the like which are required high room-temperature strength.

SUMMARY OF THE INVENTION

To achieve the above object, the inventors of the present invention noticed the effect of halogen elements contained in silicon nitride sintered bodies on their room-temperature strength, evaluated the room-temperature strength of silicon nitride sintered bodies with various halogen element contents, and found that silicon nitride sintered bodies with higher halogen element contents exhibit higher room-temperature strength. This invention was completed based on the knowledge thus obtained.

According to the present invention, it is provided a silicon nitride sintered body consisting essentially of silicon nitride and sintering additives, which sintered body contains a halogen element content of 200 ppm or above. It is preferred that the high-strength silicon nitride sintered body of the present invention has a room-temperature strength of 800 MPa or more. "Room-temperature strength" used herein is the four-point flexural strength at room temperature measured in accordance with JIS R 1601.

DETAILED DESCRIPTION OF THE INVENTION

In ordinary sintering processes for silicon nitride sintered bodies, a liquid phase is first formed by the reaction of $SiO_2$ present on the surface of α-type silicon nitride particle with oxides added as sintering additives. Next, α-type silicon nitride particle is dissolved in this liquid phase, and is precipitated as β-type silicon nitride particles. The precipitated β-type silicon nitride particles grow as sintering proceeds.

What is important here for the structure of sintered bodies is the size and denseness of the β-type silicon nitride particles. It is also important for the densification of the sintered bodies that the viscosity of the formed liquid phase is low so that the liquid permeates between silicon nitride particles.

The silicon nitride sintered body of the present invention contains 200 ppm or more, preferably 500 ppm or more of a halogen element. The silicon nitride sintered bodies containing such a large amount of a halogen element are produced by using silicon nitride powder containing a corresponding amount of the halogen element. When a large amount of the halogen element is contained in the silicon nitride powder, the liquid-phase formation temperature is lowered, and β-type silicon nitride particles are precipitated quickly. Therefore, the precipitated β-type silicon nitride particles grow to larger particles than in conventional cases (where halogen element content is low). The halogen elements lower the viscosity of the liquid phase, and a large amount of the liquid permeates between silicon nitride particles to form denser sintered bodies. Due to the action of the halogen elements during the sintering process, the silicon nitride sintered body of the present invention exhibits a high strength near room temperature.

Although such an effect for improving room-temperature strength is obtained when the silicon nitride sintered body contains any halogen element, fluorine and chlorine are especially effective among halogen elements, and fluorine has the highest effect. It is especially preferred that the fluorine content in the silicon nitride sintered body is 200 ppm or more.

In the present invention the reason why the content of the halogen element is 200 ppm or more is as follows: An object of the present invention is the application to mechanical parts and the like whose room-temperature strength is important such as sliding members, and for achieving such an object, the silicon nitride sintered body is desired to have a room-temperature strength of at least about 800 MPa. The inventors of the present invention produced silicon nitride sintered bodies containing various amounts of halogen elements, measured their room-temperature strength, and found that a high room-temperature strength of 800 MPa or higher is achieved when a sintered body contains 200 ppm or more of a halogen element, although it differs depending on the properties of the material powder and manufacturing conditions.

Although there is no limitation in the upper limit of the halogen element content in sintered bodies, it is preferred to limit the content up to 2000 ppm, because if the content is too high, hardness and wear resistance lower, the heat resistance of the grain boundary phase is degraded, and strength especially at a temperature of 800° C. or above is much degraded.

The silicon nitride sintered body of the present invention is produced using silicon nitride powder containing a halogen element in an amount corresponding to the halogen element content in the sintered body of 200 ppm or more. (In the actual process, since the halogen element content of the sintered body is about 70–80 percent of the halogen element content of the starting material powder due to the evaporation of the halogen element during sintering, the powder containing the halogen element in a larger amount than the halogen element content of the final sintered body is used.) If the content of the halogen element is low, the halogen element content of the starting material powder is adjusted by treating the powder with an aqueous solution of hydrogen fluoride or hydrogen chloride, or by adding calcium fluoride, calcium chloride, magnesium fluoride or magnesium chloride to the powder.

The halogen element contents in the powder and in the sintered body can be measured by the thermal hydrolysis-ion chromatography method (a method for determining halogen elements extracted by thermal hydrolysis quantitatively using ion chromatography). Specifically, determination can be performed in accordance with the procedures described in JIS H 1698 (Method for Determination of Fluorine in Tantalum) except using ion chromatography instead of absorption photomerry.

The silicon nitride sintered body of the present invention is produced by adding and mixing a desired amount of sintering additives such as $Y_2O_3$, $Yb_2O_3$, $CeO_2$, MgO, SrO, and $ZrO_2$ in the above silicon nitride powder, molding the mixture into a desired shape, and sintering the resultant molded body at a temperature suitable for sintering. Mixing, molding and sintering may be performed by well-known methods. For example, any of press molding, injection molding, casting, or extrusion may be used for molding; and any of pressureless sintering, hot-press sintering or HIP sintering may be used for sintering.

The present invention will be described in further detail referring to preferred embodiments, but the present invention is not limited to these embodiments.

EXAMPLES 1–4

To silicon nitride powder (α-phase content=93 percent, average particle diameter=0.6 μm, specific surface area=10 $m^2/g$) having halogen element contents as shown in Table 1, 1 percent SrO, 4 percent MgO, and 5 percent $CeO_2$ as sintering additives were added, and water was added and mixed. The slurry thus obtained was granulated by spray drying to form granule for molding. Next, the granule for molding was molded into a plate (60×60×6 mm) by cold isostatic press under the pressure of 3000 $kg/cm^2$, and the obtained molded body was sintered in a nitrogen atmosphere at 1750° C. for one hour to obtain a silicon nitride sintered body. Test pieces measuring 3×4×40 mm were cut from the obtained silicon nitride sintered body, and four-point flexural strength at room temperature was measured in accordance with JIS R 1601. The results are shown in Table 1. The halogen element contents in silicon nitride sintered bodies are also shown in Table 1.

EXAMPLES 5–7

Silicon nitride powder (a-phase content=93 percent, average particle diameter=0.6 μm, specific surface area=10 $m^2/g$) containing 100 ppm or less of halogen elements was treated with an aqueous solution of hydrogen fluoride to adjust the halogen element contents of the silicon nitride powder to values shown in Table 1. Using such silicon nitride powder, silicon nitride sintered bodies were prepared in the same way as in Examples 1–4, and four-point flexural strength was measured. The results are shown in Table 1. The halogen element contents in silicon nitride sintered bodies are also shown in Table 1.

EXAMPLE 8

Silicon nitride powder (α-phase content=93 percent, average particle diameter=0.6 μm, specific surface area=10 $m^2/g$) containing 100 ppm or less of halogen elements was treated with an aqueous solution of hydrogen chloride to adjust the halogen element contents of the silicon nitride powder to values shown in Table 1. Using this silicon nitride powder, silicon nitride sintered body was prepared in the same way as in Examples 1–4, and four-point flexural strength was measured. The results are shown in Table 1. The halogen element contents in silicon nitride sintered body are also shown in Table 1.

EXAMPLE 9

To silicon nitride powder (α-phase content=93 percent, average particle diameter=0.6 μm, specific surface area=10 $m^2/g$) containing 100 ppm or less of halogen elements, magnesium fluoride was added and mixed to adjust the halogen element contents of the silicon nitride powder to values shown in Table 1. Using this silicon nitride powder, silicon nitride sintered body was prepared in the same way as in Examples 1–4. For MgO added as a sintering additive, the amount of magnesium was calculated from the amount of magnesium fluoride added for adjusting the halogen element content, and deducted from the amount of magnesium in MgO added as a sintering additive to adjust the amount of total magnesium mixed in the starting material powder became the same as in Examples 1–4. The four-point flexural strength of obtained silicon nitride sintered body was measured. The results are shown in Table 1. The halogen element contents in silicon nitride sintered body are also shown in Table 1.

EXAMPLE 10

To silicon nitride powder (α-phase content=93 percent, average particle diameter=0.6 μm, specific surface area=10 $m^2/g$) containing 100 ppm or less of halogen elements, magnesium chloride was added and mixed to adjust the halogen element contents of the silicon nitride powder to values shown in Table 1. Using this silicon nitride powder, silicon nitride sintered body was prepared in the same way as in Examples 1–4. For MgO added as a sintering additive, the amount of magnesium was calculated from the amount of magnesium chloride added for adjusting the halogen element content, and deducted from the amount of magnesium in MgO added as a sintering additive to adjust the amount of total magnesium mixed in the starting material powder became the same as in Examples 1–4. The four-point flexural strength of obtained silicon nitride sintered body was measured. The results are shown in Table 1. The halogen element contents in silicon nitride sintered body are also shown in Table 1.

EXAMPLE 11

Silicon nitride powder (α-phase content=97 percent, average particle diameter=0.4 μm, specific surface area=10 $m^2/g$) containing 100 ppm or less of halogen elements was treated with an aqueous solution of hydrogen fluoride to adjust the halogen element contents of the silicon nitride powder to values shown in Table 1. Using this silicon nitride powder, silicon nitride sintered body was prepared in the same way as in Examples 1–4, and four-point flexural strength was measured. The results are shown in Table 1.

same way as in Examples 1–4, and four-point flexural strength was measured. The results are shown in Table 1. The halogen element contents in silicon nitride sintered body are also shown in Table 1.

TABLE 1

| | Method of adding halogen element | Material powder | | | Sintered body | | | Strength of sintered body (MPa) |
|---|---|---|---|---|---|---|---|---|
| | | Halogen element content (ppm) | Fluorine content (ppm) | Chlorine content (ppm) | Halogen element content (ppm) | Fluorine content (ppm) | Chlorine content (ppm) | |
| Example | | | | | | | | |
| 1 | Contained in $Si_3N_4$ powder | 280 | 280 | 0* | 230 | 230 | 0* | 850 |
| 2 | Contained in $Si_3N_4$ powder | 530 | 530 | 0* | 370 | 370 | 0* | 900 |
| 3 | Contained in $Si_3N_4$ powder | 840 | 640 | 200 | 630 | 480 | 150 | 970 |
| 4 | Contained in $Si_3N_4$ powder | 1060 | 850 | 210 | 850 | 630 | 220 | 1050 |
| 5 | HF treatment of $Si_3N_4$ powder | 300 | 300 | 0* | 250 | 250 | 0* | 850 |
| 6 | HF treatment of $Si_3N_4$ powder | 710 | 710 | 0* | 550 | 550 | 0* | 950 |
| 7 | HF treatment of $Si_3N_4$ powder | 1210 | 1210 | 0* | 1030 | 1030 | 0* | 1200 |
| 8 | HCl treatment of $Si_3N_4$ powder | 800 | 0* | 800 | 500 | 0* | 500 | 820 |
| 9 | Addition of $MgF_2$ during formulating | 900 | 900 | 0* | 600 | 600 | 0* | 1000 |
| 10 | Addition of $MgCl_2$ during formulating | 450 | 0* | 450 | 200 | 0* | 200 | 800 |
| 11 | HF treatment of $Si_3N_4$ powder | 950 | 0* | 950 | 660 | 0* | 660 | 1250 |
| Comparative example | | | | | | | | |
| 1 | Contained in $Si_3N_4$ powder | 180 | 150 | 30 | 120 | 110 | 10 | 760 |
| 2 | Contained in $Si_3N_4$ powder | 105 | 105 | 0* | 90 | 90 | 0* | 725 |
| 3 | Contained in $Si_3N_4$ powder | 80 | 30 | 50 | 50 | 10 | 40 | 680 |
| 4 | Contained in $Si_3N_4$ powder | 60 | 10 | 50 | 35 | 0* | 35 | 1050 |

*Detection limit: 10 ppm or less

The halogen element contents in silicon nitride sintered body are also shown in Table 1.

COMPARATIVE EXAMPLES 1–3

Using silicon nitride powder (α-phase content=93 percent, average particle diameter=0.6 μm, specific surface area=10 m²/g) having halogen element contents as shown in Table 1, silicon nitride sintered bodies were prepared in the same way as in Examples 1–4, and four-point flexural strength was measured. The results are shown in Table 1. The halogen element contents in silicon nitride sintered bodies are also shown in Table 1.

COMPARATIVE EXAMPLES 4

Using silicon nitride powder (α-phase content=97 percent, average particle diameter=0.4 μm, specific surface area=10 m²/g) having halogen element contents as shown in Table 1, silicon nitride sintered body was prepared in the As results in Table 1 show, silicon nitride sintered bodies of Examples 1–10, whose halogen element contents were 200 ppm or higher, exhibited higher room-temperature strength than silicon nitride sintered bodies of Comparative Examples 1–3, whose halogen element contents were less than 200 ppm. Also, when silicon nitride powder having different powder properties, such as β-phase content and average particle diameter, was used, silicon nitride sintered bodies whose halogen element contents were 200 ppm or higher exhibited higher room-temperature strength than silicon nitride sintered bodies whose halogen element contents were less than 200 ppm, as seen from the results of Example 11 and Comparative Example 4. From the above results, it was found that silicon nitride sintered bodies whose halogen element contents were 200 ppm or higher exhibited higher room-temperature strength than silicon nitride sintered bodies whose halogen element contents were less than 200 ppm regardless of the powder properties of silicon nitride powder.

As described above, silicon nitride sintered bodies according to the present invention have high strength at near room temperature. Therefore, such sintered bodies may be used favorably as a structural material for mechanical parts and the like, such as sliding members, whose strength at near room temperature is important.

What is claimed is:

1. A silicon nitride sintered body consisting essentially of silicon nitride and a sintering additive, which body contains a halogen element content of 200 ppm or above.

2. A silicon nitride sintered body according to claim 1, wherein said halogen element is fluorine.

3. A silicon nitride sintered body according to claim 1, wherein a content of the halogen element is in a range of 200 ppm to 2000 ppm.

4. A silicon nitride sintered body according to claim 1, whose strength at room temperature is 800 MPa or more.

* * * * *